US009486747B2

(12) United States Patent
Deng et al.

(10) Patent No.: US 9,486,747 B2
(45) Date of Patent: Nov. 8, 2016

(54) NANOCOMPOSITE MEMBRANES WITH ADVANCED ANTIFOULING PROPERTIES UNDER VISIBLE LIGHT IRRADIATION

(71) Applicants: Baolin Deng, Columbia, MO (US); Jun Yin, Columbia, MO (US)

(72) Inventors: Baolin Deng, Columbia, MO (US); Jun Yin, Columbia, MO (US)

(73) Assignee: The Curators of the University of Missouri, Columbia, MO (US)

( * ) Notice: Subject to any disclaimer, the term of this patent is extended or adjusted under 35 U.S.C. 154(b) by 0 days.

(21) Appl. No.: 14/821,390

(22) Filed: Aug. 7, 2015

(65) Prior Publication Data
US 2016/0045874 A1 Feb. 18, 2016

Related U.S. Application Data

(60) Provisional application No. 62/070,012, filed on Aug. 12, 2014.

(51) Int. Cl.
*B01D 39/00* (2006.01)
*B01D 39/14* (2006.01)
(Continued)

(52) U.S. Cl.
CPC .............. *B01D 69/08* (2013.01); *B01D 65/08* (2013.01); *B01D 69/02* (2013.01); *B01D 69/148* (2013.01); *B01D 71/34* (2013.01); *B01D 2321/343* (2013.01)

(58) Field of Classification Search
CPC B01D 2239/065; B01D 65/08; B01D 69/08; B01D 71/34
USPC .................................................... 210/502.1
See application file for complete search history.

(56) References Cited

U.S. PATENT DOCUMENTS

| 8,800,783 B2 * | 8/2014 | Matsuyama | B01D 71/56 210/500.23 |
|---|---|---|---|
| 2012/0142238 A1 * | 6/2012 | Saitou | B01J 21/063 442/59 |

(Continued)

OTHER PUBLICATIONS

Chen, X., et al., "Increasing solar absorption for photocatalysis with black hydrogenated titanium dioxide nanocrystals," Science, 2011, 331, (6018), pp. 746-750.

(Continued)

*Primary Examiner* — Ana Fortuna
(74) *Attorney, Agent, or Firm* — Polster Lieder

(57) ABSTRACT

Nitrogen doped TiO2 (N—TiO2) is used to fabricate Poly (vinyledene fluoride) (PVDF)/N—TiO2 mixed matrix hollow fiber membranes (HFMs) through a phase inversion method to improve filtration efficiencies and antifouling properties. The membranes performances were evaluated based on the water permeability, humic acid (HA) rejection and antifouling properties. Resulting membranes showed brown color and improved hydrophilicity, especially under light irradiation. When compared to original PVDF and PVDF/P25 membrane, mixed matrix membranes containing N—TiO2 nanoparticles (NPs) showed clear photocatalytic activities under visible light irradiation. Also, membrane performance assessments indicated that PVDF/N—TiO2 membranes possessed enhanced water flux, similar HA rejection (e.g., above 96%) and improved fouling resistance with PVDF membranes as a control. The results demonstrate the potential of the suggested methodology for development of membranes with improved water permeability and superior antifouling properties based on photo-degradation processes and photo-induced hydrophilicity enhancement driven by solar light as a renewable energy source.

21 Claims, 10 Drawing Sheets
(10 of 10 Drawing Sheet(s) Filed in Color)

(51) Int. Cl.
B29C 65/20 (2006.01)
B29C 47/00 (2006.01)
B01D 69/08 (2006.01)
B01D 65/08 (2006.01)
B01D 69/02 (2006.01)
B01D 69/14 (2006.01)
B01D 71/34 (2006.01)

(56) References Cited

U.S. PATENT DOCUMENTS

| | | | | |
|---|---|---|---|---|
| 2012/0234694 A1* | 9/2012 | Vecitis | ............... | B01D 39/2055 205/747 |
| 2013/0344124 A1* | 12/2013 | Hashimoto | ............ | A01N 59/20 424/419 |
| 2016/0045874 A1* | 2/2016 | Deng | ..................... | B01D 69/08 210/500.23 |
| 2016/0049262 A1* | 2/2016 | Bettinger | ............... | H01G 11/48 429/213 |
| 2016/0052845 A1* | 2/2016 | Kawamura | ............. | C07C 29/80 528/308.8 |

OTHER PUBLICATIONS

Razmjou, A., et al., "The effect of modified TiO 2 nanoparticles on the polyethersulfone ultrafiltration hollow fiber membranes," Desalination, 2012, 287, pp. 271-280.
Rajaeian, B., et al., "Fabrication and characterization of polyamide thin film nanocomposite (TFN) nanofiltration membrane impregnated with TiO2 nanoparticles," Desalination, 2013, 313, (0), pp. 176-188.
Wang, X., et al., "Solvothermal synthesis of C—N codoped TiO2 and photocatalytic evaluation for bisphenol A degradation using a visible-light irradiated LED photoreactor," Applied Catalysis 8: Environmental, 2010,100, (1-2), pp. 355-364.
Li, Zhibiao, "Mechanisms of transparent exopolymer particles (TEPs) fouling on ultra-filtration and its reduction by PVDF/N-TiO2 HFM," Thesis, Jul. 2014, 46 pgs.
Wang, X., et al., "Ultrafiltration of natural water by poly(vinylidene fluoride) (PVDF)/N-TiO2 mixed matrix hollow fiber membranes (HFMs) with advanced antifouling properties under visible light irradiation," Chemistry & Global Stewardship, San Francisco, CA, Aug. 10-14, 2014, 1 page.
Fujishima, A., et al.; "Electrochemical photolysis of water at a semiconductor electrode," Nature, 1972, 238, (5358), pp. 37-38.
Mills, A., et al., "An overview of semiconductor photocatalysis," Journal of Photochemistry and Photobiology A: Chemistry, 1997, 108, (1), pp. 1-35.
Paz, Y., "Application of TiO2 photocatalysis for air treatment: Patents' overview," Applied Catalysis 8: Environmental, 2010, 99, (3-4), pp. 448-460.
Yu, J., et al., "Effects of calcination temperature on the photocatalytic activity and photo-induced super-hydrophilicity of mesoporous TiO2 thin films," New Journal of Chemistry, 2002, 26, (5), pp. 607-613.
Chong, M.N., et al., "Recent developments in photocatalytic water treatment technology: A review," Water Research, 2010, 44 (10), pp. 2997-3027.
Chen, X., et al., "Titanium dioxide nanomaterials: Synthesis, properties, modifications and applications," Chemical Reviews, 2007, 107, (7), pp. 2891-2959.
Joung, S.K., et al., "Mechanistic studies of the photocatalytic oxidation of trichloroethylene with visible-light-driven N-doped TiO2 photocatalysts," Chemistry—A European Journal, 2006, 12, (21), pp. 5526-5534.
Nazeeruddin, M.K., et al., "Efficient panchromatic sensitization of nanocrystalline TiO2 films by a black dye based on a trithiocyanato-ruthenium complex," Chemical Communications, 1997, (18), pp. 1705-1706.

Hara, K., et al., "Dye-sensitized nanocrystalline TiO2 solar cells based on novel coumarin dyes," Solar Energy Materials and Solar Cells, 2003, 77, (1), pp. 89-103.
Mrowetz, M., et al., "Effect of Au nanoparticles on TiO2 in the photocatalytic degradation of an azo dye," Gold Bulletin, 2007, 40, (2), pp. 154-160.
Sangpour, P., et al., "Photoenhanced degradation of methylene blue on cosputtered M:TiO 2 (M=Au, Ag, Cu) nanocomposite systems: A comparative study," Journal of Physical Chemistry C, 2010, 114, (33), pp. 13955-13961.
Serpone, N., "Is the band gap of pristine TiO2 narrowed by anion- and cation-doping of titanium dioxide in second-generation photocatalysts?," Journal of Physical Chemistry B, 2006, 110, (48), pp. 24287-24293.
Xu, A.W., et al., "The preparation, characterization, and their photocatalytic activities of rare-earth-doped TiO2 nanoparticles," Journal of Catalysis, 2002, 207, (2), pp. 151-157.
Asahi, R., et al., "Visible-light photocatalysis in nitrogen-doped titanium oxides," Science, 2001, 293, (5528), pp. 269-271.
Di Valentin, C., et al., "N-doped TiO2: Theory and experiment," Chemical Physics, 2007, 339, (1-3), pp. 44-56.
Morikawa, T., et al., "Band-gap narrowing of titanium dioxide by nitrogen doping," Japanese Journal of Applied Physics, Part 2: Letters, 2001, 40, (6 A), pp. L561-L563.
Ho, W., et al., "Synthesis of hierarchical nanoporous F-doped TiO2 spheres with visible light photocatalytic activity," Chemical Communications, 2006, (10), pp. 1115-1117.
Ohno, T., et al., "Preparation of S-doped TiO2 photocatalysts and their photocatalytic activities under visible light," Applied Catalysis A: General, 2004, 265, (1), pp. 115-121.
Ohno, T., et al., "Photocatalytic activity of S-doped TiO2 photocatalyst under visible light," Chemistry Letters, 2003, 32, (4), pp. 364-365.
Yu, J., et al., "Preparation, characterization and visible-light-driven photocatalytic activity of Fe-doped titania nanorods and first-principles study for electronic structures," Applied Catalyis B: Environmental, 2009, 90, (3-4), pp. 595-602.
Herrmann, J.M., et al., "Effect of chromium doping on the electrical and catalytic properties of powder titania under UV and visible illumination," Chemical Physics Letters, 1984, 108, (6), pp. 618-622.
Colon, G., et al., "Cu-doped TiO2 systems with improved photocatalytic activity," Applied Catalysis B: Environmental, 2006, 67, (1-2), pp. 41-51.
Devi, L.G., et al., "Influence of Mn2+ and Mo6+ dopants on the phase transformations of TiO2 lattice and its photo catalytic activity under solar illumination," Catalysis Communications, 2009, 10, (6), pp. 794-798.
Murphy, A.B., "Does carbon doping of TiO2 allow water splitting in visible light? Comments on "Nanotube enhanced photoresponse of carbon modified (CM)-n-TiO2 for efficient water splitting"," Solar Energy Materials and Solar Cells, 2008, 92, (3), pp. 363-367.
Xi, W., "Separation of titanium dioxide from photocatalytically treated water by cross-flow microfiltration," Water Research, 2001, 35, (5), pp. 1256-1262.
Le-Clech, P., et al., "Hybrid photocatalysis/membrane treatment for surface waters containing low concentrations of natural organic matters," Water Research, 2006, 40, (2), pp. 323-330.
Kim, J., et al., "The use of nanoparticles in polymeric and ceramic membrane structures: Review of manufacturing procedures and performance improvement for water treatment," Environmental Pollution, 2010, 158, (7), pp. 2335-2349.
Sotto, A, et al., "Effect of nanoparticle aggregation at low concentrations of TiO 2 on the hydrophilicity, morphology, and fouling resistance of PES-TiO 2 membranes," Journal of Colloid and Interface Science, 2011, 363, (2), pp. 540-550.
Xiao, Y.T., et al., "Progress of applied research on TiO 2 photocatalysis-membrane separation coupling technology in water and wastewater treatments," Chinese Science Bulletin, 2010, 55, (14), pp. 1345-1353.
Kwak, S.Y., et al., "Hybrid organic/inorganic reverse osmosis (RO) membrane for bactericidal anti-fouling. 1. Preparation and characterization of TiO2 nanoparticle self-assembled aromatic polyamide thin-film-composite (TFC) membrane," Environmental Science and Technology, 2001, 35, (11), pp. 2388-2394.

(56) References Cited

OTHER PUBLICATIONS

Kim, S.H., et al., "Design of TiO2 nanoparticle self-assembled aromatic polyamide thin-film-composite (TFC) membrane as an approach to solve biofouling problem," Journal of Membrane Science, 2003, 211, (1), pp. 157-165.

Bae, T.-H., et al., "Preparation of TiO2 self-assembled polymeric nanocomposite membranes and examination of their fouling mitigation effects in a membrane bioreactor system," Journal of Membrane Science, 2005, 266, (1-2), pp. 1-5.

Bae, T.-H, et al., "Effect of TiO2 nanoparticles on fouling mitigation of ultrafiltration membranes for activated sludge filtration," Journal of Membrane Science, 2005, 249, (1-2), pp. 1-8.

Wu, G., et al., "Preparation and characterization of PES/TiO 2 composite membranes," Applied Surface Science, 2008, 254, (21), pp. 7080-7086.

Razmjou, A., "The effects of mechanical and chemical modification of TiO 2 nanoparticles on the surface chemistry, structure and fouling performance of PES ultrafiltration membranes," Journal of Membrane Science, 2011, 378, (1-2), pp. 73-84.

Hu, W., et al., "Application of nano TiO2 modified hollow fiber membranes in algal membrane bioreactors for high-density algae cultivation and wastewater polishing," Bioresource Technology, 2015, 193, pp. 135-141.

Yu, I..Y., et al., "PVDF-TiO 2 composite hollow fiber ultrafiltration membranes prepared by TiO 2 sol-gel method and blending method," Journal of Applied Polymer Science, 2009, 113, (3), pp. 1763-1772.

Wang, Z., et al., "Photocatalytic degradation of phenol in aqueous nitrogen-doped TiO 2 suspensions with various light sources," Applied Catalysis B: Environmental, 2005, 57, (3), pp. 223-231.

Yin, J., et al., "Multi-walled carbon nanotubes (MWNTs)/ polysulfone (PSU) mixed matrix hollow fiber membranes for enhanced water treatment," Journal of Membrane Science, 2013, 437, pp. 237-248.

Deng, B., et al., "Antifouling microfiltration membranes prepared from acrylic acid or methacrylic acid grafted poly (vinylidene fluoride) powder synthesized via pre-irradiation induced graft polymerization," Journal of Membrane Science, 2010, 350, (12), pp. 252-258.

Madaeni, S.S., et al., "A new approach to improve antifouling property of PVDF membrane using in situ polymerization of PAA functionalized TiO2 nanoparticles," Journal of Membrane Science, 2011, 380, (1-2), pp. 155-162.

Rahimpour, A., et al., "Coupling TiO2 nanoparticles with UV irradiation for modification of polyethersulfone ultrafiltration membranes," Journal of Membrane Science, 2008, 313, (1-2), pp. 158-169.

Zhang, X., et al., "TiO2 nanowire membrane for concurrent filtration and photocatalytic oxidation of humic acid in water," Journal of Membrane Science, 2008, 313, (1-2), pp. 44-51.

Fujishima, A., et al., "Titanium dioxide photocatalysis. Journal of Photochemistry and Photobiology C: Photochemistry Reviews," 2000, 1, (1), pp. 1-21.

Wang, R., et al., "Light-induced amphiphilic surfaces," Nature, 1997, 388, (6641), pp. 431-432.

Liu, F., et al., "Preparation of hydrophilic and fouling resistant poly(vinylidene fluoride) hollow fiber membranes," Journal of Membrane Science, 2009, 345, (1-2), pp. 331-339.

Jonsson, C., et al., "Influence of the membrane material on the adsorptive fouling of ultrafiltration membranes," Journal of Membrane Science, 1995, 108, (1-2), pp. 79-87.

Cornelissen, E.R., et al., "Physicochemical aspects of polymer selection for ultrafiltration and microfiltration membranes," Colloids and Surfaces A: Physicochemical and Engineering Aspects, 1998, 138, (2-3), pp. 283-289.

Li, D., et al., "Visible-light-driven N—F-codoped TiO2 photocatalysts. 2. Optical characterization, photocatalysis, and potential application to air purification," Chemistry Materials, 2005, 17, (10), pp. 2596-2602.

Ghows, N., et al., "Fast and easy synthesis of core—shell nanocrystal (CdS/Ti02) at low temperature by micro-emulsion under ultrasound," Ultrasonics Sonochemistry, 2011, 18, (2), pp. 629-634.

\* cited by examiner

NANOCOMPOSITE MEMBRANES WITH ADVANCED ANTIFOULING PROPERTIES UNDER VISIBLE LIGHT IRRADIATION

CROSS REFERENCE TO RELATED APPLICATIONS

This application is based upon and claims the benefit of U.S. provisional patent application 62/070,012 filed Aug. 12, 2014, the disclosure of which is incorporated herein by reference in its entirety.

STATEMENT REGARDING FEDERALLY SPONSORED RESEARCH OR DEVELOPMENT

This invention was made with United States government support under
Grant No. 2010-38821-21558 awarded by the USDA, and Grant No. G11AP20089 awarded by the USGS. The United States government has certain rights in the invention described and claimed herein.

NOTE: Throughout this Specification, the bracketed numbers refer to the correspondingly listed references in Appendix A attached hereto.

BACKGROUND OF THE INVENTION

This invention relates to novel antifouling membranes produced by integrating fillers exhibiting visible light photocatalytic activity.

Polymeric membranes have been widely used for desalination and water softening, membrane bioreactors for wastewater treatment, biomedical and pharmaceutical materials separation, and other chemical engineering applications. However, undesirable fouling of membranes decreases their permeability, reduces their permeate quality, and increases the energy costs of a separation process in which the membranes are used.

The pioneering paper of Fujishima and Honda [1] on water splitting opened the way to significant research and studies of titanium dioxide ($TiO_2$). Now, $TiO_2$ is widely used for water splitting, water treatment, air purification and self-cleaning of surfaces. This is because of its unique photo-catalytic properties, stability, commercial availability, and ease of preparation [2, 3]. With the increasing awareness of environmental issues, $TiO_2$ is considered an ideal choice as a catalyst for water treatment due to its high oxidation power, photo-induced hydrophilicity, long-term photo-stability, high transparency in the visible range of light, good thermal and chemical stability, and non-toxicity [4, 5]. However, technical barriers have hindered its commercialization. These include the high level of energy input (UV light) required to implement photo-degradation, and post-recovery of catalyst particles after water treatment [5].

Because of its relatively large band gap of 3.2 eV, $TiO_2$ (anatase) can only be activated by UV light having a wavelength shorter than 380 nm [6]. Accordingly, $TiO_2$ can only take advantage of 3-4% of the solar energy reaching the earth [7]. Many attempts have been made to prepare a $TiO_2$ photo-catalyst which can be activated under visible light with reasonable efficiency. These attempts include dye sensitization [8, 9], noble metal deposition [10, 11], and metal or non-metal doping [6, 12, 13]. Since the discovery by Asahi et al. [14] of N-doped $TiO_2$ with a visible light absorption, a great amount of attention has been given to modifying the electronic band gap of $TiO_2$ using a doping method. Various elements including Nitrogen (N) [15, 16], Fluorine (F) [17], Sulfur (S) [18, 19], Iron (Fe) [20], Cobalt (Co) and Chromium (Cr) [21], Copper (Cu) [22], and Manganese (Mn) [23] have been studied in the attempt to enhance the photocatalytic performance of $TiO_2$ in the visible light region. Compared to other nonmetal elemental doping, N-doped $TiO_2$ materials exhibit a significant photocatalytic activity under visible light irradiation. This is probably because N 2p states mix with O 2p states due to the fact that the respective energy levels are very close to each other [14, 24].

Many researchers have coupled $TiO_2$ photocatalysis with membrane separation to solve the problem of post-recovery. For example, Xi and Geissen [25] reported the separation of $TiO_2$ from water by cross-flow microfiltration (MF) within wastewater treatment by photocatalysis using slurry reactor systems. In their study, separation efficiency was strongly affected by cross-flow velocity, transmembrane pressure (TMP), feed concentration, pH of the suspension, and ionic strength. Le-Clech et al. [26] reported that a hybrid photocatalysis-Poly(vinylene fluoride); i.e., PVDF, MF membrane process was effective as a polishing treatment of surface water containing low concentrations of natural organic matters. During the process, the membrane would totally reject $TiO_2$ slurry particles and separate them from the treated water.

Due to the hydrophilic properties of $TiO_2$, incorporation of this type of nano-particles (NPs) into the membrane structure would enhance the composite material's affinity to the water and hence membrane water permeation and fouling resistance [27, 28].

So, combining $TiO_2$'s unique properties with membrane technology through integrating $TiO_2$ with the membrane provides an opportunity for advanced water treatment. This integration not only keeps the characteristics and capacity provided by these two technologies, but also produces certain synergistic effects which overcome some the drawbacks of the single technology [29]. First, pollutants could be oxidized by the photocatalysis, while the membranes demonstrate the capability not only to retain the photocatalyst, but also to partially reject organic species by controlling their residence time in the reacting system. That is, the membrane works as a selective barrier for targeted molecules. Therefore, this technology can enhance photocatalytic efficiency and achieve excellent effluent quality. Second, the integrating technology can solve or mitigate the problem of flux decline associated with membrane fouling [25]. Because $TiO_2$ particles on the membrane surface not only increase membrane hydrophilicity, but also create a photocatalytic property, formation of cake layer and blocking of membrane pores are prevented which can extend membrane life.

There are two main approaches for fabricating $TiO_2$ nanocomposite membranes: first, depositing NPs onto membrane surface, and, second, blending the NPs into the membrane.

In the depositing approach, $TiO_2$ NPs are coated or grafted onto the membrane's outer surface. For example, Kuak et al. [30] and Kim et al. [31] prepared one kind of hybrid composite membrane by self-assembly of $TiO_2$ NPs through interaction with the COOH functional group of an aromatic polyamide thin-film layer. The membrane possessed an excellent anti-bacterial effect on *E. coli* and good antifouling properties under UV light irradiation. Bae and Tak [32] immobilized the $TiO_2$ NPs on the membrane's surface using a dipping method so to increase the surface hydrophilicity for filtration of a mixed liquor from a membrane bioreactor (MBR). Test results showed that membrane fouling was considerably mitigated though the flux still declined to some extent.

In the blending approach, $TiO_2$ NPs are dispersed in a casting solution and then membranes are cast by a phase separation method widely used for the preparation of polymeric membranes. For example, Bae and Tak [33] entrapped $TiO_2$ NPs in a polymeric membrane to mitigate fouling during active sludge filtration. Wu et al. [34] prepared Polyethersulfone (PES)/$TiO_2$ composite membranes which showed enhanced hydrophilicity, thermal stability, mechanical strength and antifouling ability. Thermogravimetric analysis (TGA) and mechanical strength analysis also indicated good compatibility between polymers and $TiO_2$ NPs. To avoid agglomerations and also to improve the stability of particles in the casting solution, Razmjou et al. [35] modified Degussa P25 $TiO_2$ NPs by a combination of chemical processes and mechanical methods for fabricating ultrafiltration (UF) membranes. The incorporation of modified NPs into PES UF membranes showed a significant improvement in fouling resistance with an increase in hydrophilicity being the most likely reason for the improvements in antifouling performance. Compared to the depositing approach, the blending approach is simpler since the particles are added to the casting solution. Furthermore, the coating of membranes can result in significant undesirable changes in membrane permeability due to pore narrowing or plugging. Potential delamination of the coating layer is also a concern [35].

BRIEF SUMMARY OF THE INVENTION

The present invention is directed to antifouling membranes having integrating fillers with visible light photocatalytic activity. Key characteristics of the membranes are that not only are the surface hydrophilicity of the membrane increased, but the filler materials also affect a surface cleaning through a photodegradation process under light irradiation. This enhances the fouling resistance of the membranes to organic and biomaterials.

In accordance with the invention, nitrogen-doped $TiO_2$ NPs are synthesized and then used in a phase inversion blending process to produce or fabricate Poly(vinyledene fluoride) PVDF/N—$TiO_2$ mixed matrix HFMs which are activated by visible light. Because of the presence of light irradiation and the oxidation environment during a filtration process, PVDF is selected as the membrane material due to its superior mechanical, chemical, and thermal stabilities, as well as its antioxidation, corrosion resistance, and membrane-forming properties [36, 37]. The hydrophilicity and photocatalytic capabilities of $TiO_2$ are introduced into the membrane system to produce enhanced water permeability and resistance to fouling.

The membranes produced are examined by scanning electron microscopy (SEM), attenuated total reflection Fourier transform infrared (ATR FT-IR) spectroscopy, contact angle, UV-Vis absorbance, water uptake and molecular weight cut off (MWCO). Performance of the membranes is evaluated based on the water permeability, humic acid (HA) rejection and their antifouling properties.

The membranes are of a brown color and exhibit improved hydrophilicity, especially under light irradiation. When compared to previous PVDF and PVDF/P25 membranes, mixed matrix membranes containing N—$TiO_2$ NPs clearly demonstrate photocatalytic activities under visible light irradiation. Membrane performance assessments indicate that PVDF/N—$TiO_2$ membranes demonstrate enhanced water flux, similar levels of HA rejection (e.g., above 96%), and improved fouling resistance when compared to a PVDF membrane used as a control.

Results demonstrate the potential of membranes with improved water permeability and superior antifouling properties, based on photodegradation processes and photoinduced hydrophilicity enhancement driven by solar light as a renewable source of energy.

Other objects and features may be in part apparent and in part pointed out hereinafter.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

The accompanying figures, together with detailed description which follows, form part of the specification and illustrate the various embodiments described in the specification.

FIGS. 2a-2b are microscopic images displaying photocatalytic properties of N—$TiO_2$ in which FIG. 2a is a SEM image, and FIG. 2b a transmission electron microscope (TEM) image.

FIGS. 5a-5d are a series of four graphs illustrating characterizations of PVDF/N—$TiO_2$ membranes in which FIG. 5a is an ATR FT-IR graph, FIG. 5b a UV-Vis absorbance graph, FIG. 5c a contact angle graph, and FIG. 5d a graph of MWCO and water uptake.

FIGS. 6a-6c are graphs illustrating photocatalytic activities of PVDF/N—$TiO_2$ membranes under visible light irradiation in which FIG. 6a is a graph of a first cycle, FIG. 6b a second cycle, and FIG. 6c a third cycle. Membranes with a length of 300 cm were cut into small pieces and suspended in 50 mL MO aqueous solution for the tests on which the graphs are based produced.

FIGS. 7a-7d are graphs in which FIG. 7a illustrates pure water flux, and FIGS. 7b, 7c, and 7d fouling behaviors for membrane samples under various irradiation conditions. FIG. 7b is for PVDF/NT-2.5, FIG. 7c for PVDF/NT-5, and FIG. 7d for PVDF/NT-10. A PVDF membrane was used as a test reference. Fouling test conditions: concentration of HA feed solution was 20 mg/L; TMP was 6 psi; temperature was 23±1° C.

DETAILED DESCRIPTION OF INVENTION

Figure 1:
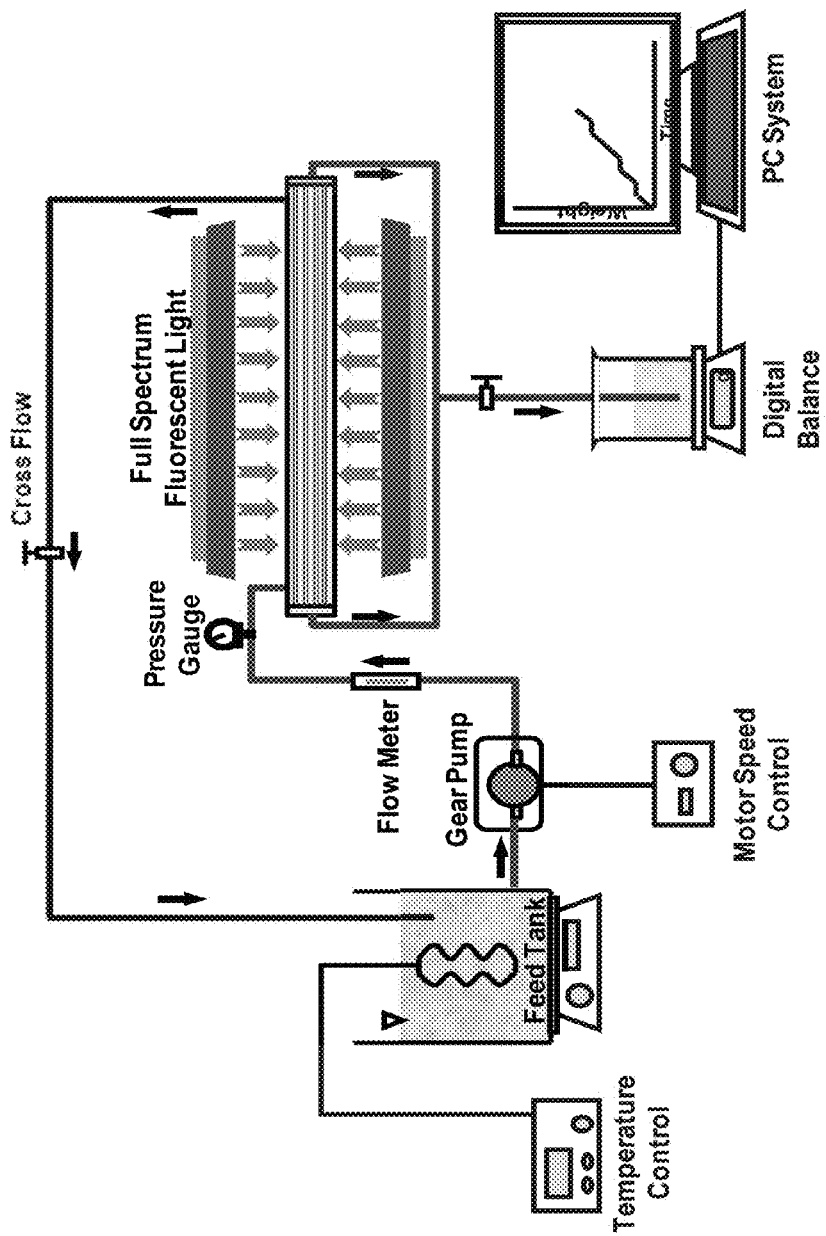
FIG. 1 is a schematic diagram of a hollow fiber membrane filtration system.

The following detailed description illustrates the invention by way of example and not by way of limitation. This description clearly enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

Materials Used

During the synthesis of N—$TiO_2$ NPs, tetrabutyl titanate $(Ti(OBu)_4$, 97%, (Aldrich) is used as a titania precursor and an ammonia aqueous solution (28-30%, Aldrich) is used as a nitrogen source. PVDF with an average molecular weight (Mw) of 180 kDa is obtainable from, for example, Sigma-Aldrich. The PVDF is dried for 3 hours at 120° C. before usage. 1-Methyl-2-pyrrolidinone (NMP, 99.5%, Aldrich) is used as a solvent. Polyvinylpyrrolidone (PVP, Aldrich) with an average Mw of 10 kDa is used as a porogen. All other chemicals used were obtained from Sigma-Aldrich and were of ACS reagent grade. The reference titania (Degussa P25) used is available, e.g., from Degussa Corporation, Germany. Deionized water (DI) is produced, e.g., by Millipore DI System (Synergy 185, 18.2 MΩ·cm) and is used for solution preparation and filtration study.

Synthesis and Characterization of N—$TiO_2$ NPs

A method modified from the literature [38] is used synthesize N—$TiO_2$ NPs. Briefly, a 10 ml ammonia aqueous solution is added, dropwise, into a 20 ml $Ti(OBu)_4$ solution at room temperature under stirring to carry out hydrolysis. After continuously stirring for 10 minutes, the precursor is dried in an oven at 120° C. for 2 hours. Finally, the $TiO_2$ precursor is calcinated at 400° C. for 1 hour to obtain N—$TiO_2$ NPs. The color of the sample powder changes from white to brown.

Morphology and particle size of NPs are examined by a SEM (e.g., Quanta FEG 600, FEI Company, Hillsboro, OR) and a TEM (e.g., JEM 1400, JEOL Ltd., Peabody, MA). A SEM specimen is prepared by dropping a NPs-ethanol mixture suspension onto a silicon wafer. After completely drying at room temperature, the specimen is coated with platinum using a sputter coater (e.g., K575x, Emitech Ltd., Kent, England) at 20 mA for 1 minute. TEM samples are prepared by dropping the same suspension onto a carbon coated copper grid and drying at room temperature.

Spinning of Hollow Fiber Membranes

PVDF/N—$TiO_2$ mixed matrix HFMs are produced by a phase inversion method on a custom-designed single-head spinning machine. To make a dope solution, an amount of N—$TiO_2$ is dispersed in an NMP solvent and sonicated for 1 hour to achieve dispersion. Next, PVP is added into the mixture which is stirred for 30 minutes. Finally, PVDF is added and the resulting mixture stirred for 6 hours at 50° C. to form a dope solution. This solution is then kept overnight for degassing prior to use.

The collected fibers are rinsed in the DI water at room temperature for at least 24 hours to remove any residual solvent. They are then immersed in a 25 wt % glycerol aqueous solution for another 24 hours before drying in the ambient environment. Experimental parameters for the spinning process are listed in Table 1 below. Membranes containing various amounts of N—$TiO_2$ are labeled as PVDF/NT-x, where x represents the concentration of NPs. For example, if a membrane sample possessed 2.5 wt % N—$TiO_2$, this membrane was named PVDF/NT-2.5.

TABLE 1

Spinning conditions of PVDF HFMs

| Parameter | Condition |
| --- | --- |
| Spinneret OD/ID | 1.0 mm/0.6 mm |
| Spinneret temperature (° C.) | 25 |
| Dope solution | PVDF/PVP/NMP |
| Concentration (wt. %) | 16/5/79 |
| Dope solution flow rate (mL/min) | 1.0 |
| Bore fluid composition | DI water |
| Bore fluid flow rate (mL/min) | 0.8 |
| Range of air-gap distance (cm) | 0 |
| Coagulant | Tap water |
| Coagulant temperature (° C.) | 25 |
| Washing bath | Tap water |
| Washing bath temperature (° C.) | 25 |
| Take-up speed (cm/min) | 360 |

Photocatalytic Properties of N—$TiO_2$ NPs and HFMs

A 300 W xenon lamp is used as a light source, together with a 400 nm glass filter, to cutoff any UV light. For each run, a 50 ml Methyl Orange (MO) aqueous solution (10 mg/L) with 25 mg of sample powders is loaded into a glass container and stirred with a magnetic stirrer at a speed of 100 rpm. After ultrasonication for 5 minutes and stirring for 10 minutes, the light is turned "on" to initiate the reaction. Another light source having four, full spectrum, fluorescent lights (e.g., 32W, Philips F32T8) is used to simulate sunlight in order to evaluate the photocatalytic properties of the N—$TiO_2$ NPs. During the test, solution temperature is maintained at 23±1° C. For HFM, membranes with a length of 300 cm are cut into small pieces and mixed with a 50 ml MO solution (10 mg/L) in an a glass container for 24 hours in dark conditions. At the end of this period, a light is turned "on" to initiate a reaction. During the test, a solution temperature of 23±1° C. is maintained.

The spectrum of the light source is recorded using a spectrometer (e.g., PC2000, Ocean Optics, Dunedin, Fla.) with a resolution of 1.5 nm and an entrance slit of 25 μm as shown in FIG. 1. In addition, power from the light source is analysed by a calorimeter (e.g., Astral AC5000, Scientech, Boulder, Colo.) connected to a power meter (e.g., Scientech Astral™ AA30) under the same conditions of photocatalytic reaction.

Membrane Characterization and Performance Assessment

Membrane surface and cross-section are measured by SEM using, for example, a Quanta FEG 600. A sample of a membrane's surface is obtained by drying a piece of membrane at room temperature; while, a cross-section of the membrane is obtained by freeze-fracturing the membranes in liquid nitrogen (LIN). The specimens are coated with platinum at 20 mA for 60 seconds prior to imaging. Hydrophilicity of the membrane surface is determined by measuring a pure water contact angle based on the sessile drop method. A video contact angle system (e.g., VCA-2500 XE, AST products, Billerica, Mass.) is, for example, employed to conduct the test. At least eight stabilized contact angles are obtained from different sites on each sample and used to calculate both the average contact angle and the standard deviation therefrom. Functional groups of membrane surface are identified by Fourier transform infrared (FT-IR) spectroscopy using, for example, a Nicolet 4700 FT-IR (e.g., Thermo Electron Corp., Waltham, Mass.). All spectra include wavelength ranges from 500 to 4000 cm$^{-1}$ with 128 scans being taken at a resolution of 1.0 cm$^{-1}$. Membrane samples are also subjected to an UV-Vis absorbance characterization using, for example, a UV-Vis recording spectrophotometer (e.g., UV2401 PC, Shimadzu Corp., Japan) for the range from 190 nm to 900 nm. A clean PVDF membrane is used as a reference sample.

A low pressure cross-flow filtration system modified from the inventors' previous work [39] is used to evaluate pure water flux, solute rejection, molecular weight cut off (MWCO), and fouling resistance of the membranes. A membrane module made with a quartz tube is sealed using an epoxy resin. The effective membrane area is approximately 10 cm$^2$. A schematic diagram of the filtration system is shown in FIG. 1.

Prior to testing, each membrane is compressed by DI water at a constant TMP of 6 psi for 3 hours. Pure water flux is measured by weighing the permeate water as a function of time, the results being recorded, for example, by a LabVIEW automated system (e.g., National Instruments LabVIEW 8.2 with Ohaus digital balance). After the flux test is completed, a feed solution containing 20 mg/L of humic acid (e.g., HA, prefiltered with a 0.45 μm filter, Aldrich) is filtrated and solute concentrations of feed and permeate solutions are measured using a UV-visible spectrophotometer (e.g., Lambda 25, PerkinElmer, Waltham, Mass.) at a wavelength of 254 nm. Three light irradiation conditions are then tested: (a) dark, (b) visible light (F32T8 fluorescent lights, 10.9 mW/cm$^2$, Philips), and (c) UV light (e.g., 602654 LPHO, 13.1 mW/cm$^2$, Trojan Technologies, Canada). Light irradiation is started 30 minutes prior to the HA filtration tests and is maintained until conclusion of the tests. Flux and rejection values are now calculated using Equation (1) and Equation (2), respectively:

$$J = \frac{V_P}{A \cdot t} \quad (1)$$

$$R = \left(1 - \frac{C_p}{C_f}\right) \times 100 \quad (2)$$

where, in Equation (1), J is water flux (L/m$^2$h), $V_P$ the permeate volume (L), A is membrane area (m$^2$) and t is treatment time (h). In Equation (2), R is the rejection ratio, and $C_p$ and $C_f$ are the concentrations of permeate and feed solution, respectively.

MWCO values of membranes are evaluated by determining the rejections of PVP (10, 40 and 360 kDa), Bovine Serum Albumin (BSA, 67 kDa) or Poly(ethylene oxide) (PEO, 100 kDa) under a solution concentration of 1000 mg/L. The MWCO of a particular membrane is defined as the molecular weight of the solute having a 90% rejection. The concentrations of PEO and PVP are measured by a TOC analyzer (e.g., TOC-5000, Shimadzu Corp., Japan), while concentrations of BSA are determined on a UV-visible spectrophotometer at 280 nm.

Results and Discussion

Figure 2A:
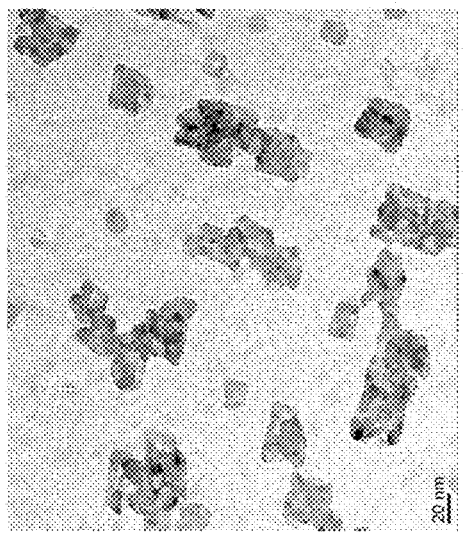
Figure 2B:
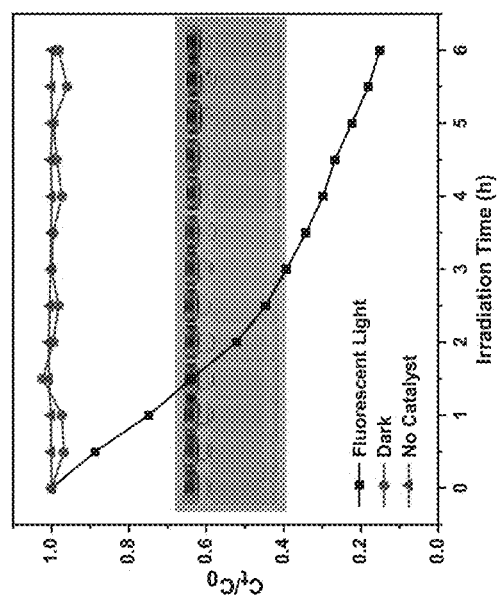
Figure 2C:
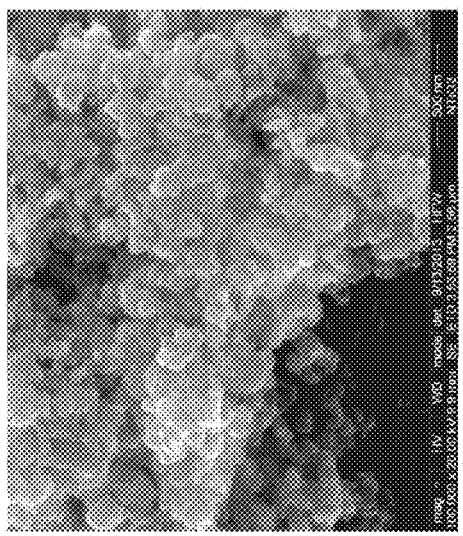
FIGS. 2c and 2d are graphs illustrating photocatalytic activities under visible light irradiation, FIG. 2c, or under fluorescent light irradiation, FIG. 2d. For photocatalytic reaction, 25 mg N—$TiO_2$ was suspended in 50 mL Methyl Orange (MO) aqueous solution and the initial concentration of MO was 20 mg/L for the graph of FIG. 2c, and 10 mg/L for the graph of FIG. 2d.
Figure 2D:
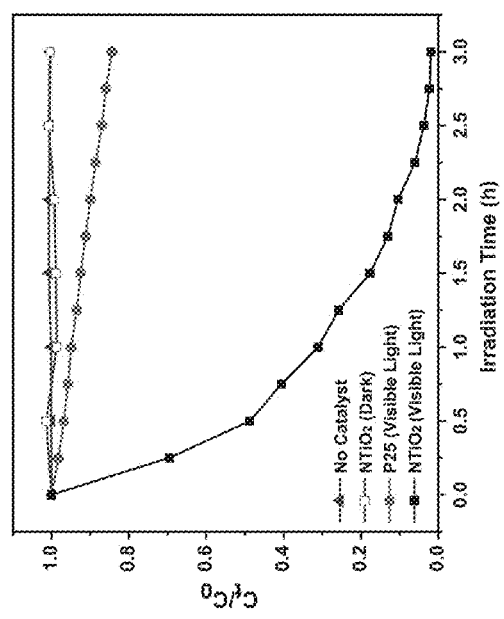

Referring to FIG. 2b, synthesized N—TiO$_2$ NPs have an average particle size of approximately 50 nm and a BET surface area of approximately 197 m$^2$/g. These values are consistent with results reported by Wang et al. [38]. As shown in FIG. 2c, N—TiO$_2$ NPs exhibited strong photocatalytic capability under visible light irradiation (436.9 mW/cm$^2$). As such, it can degrade MO (10 mg/L) by over 98% within 3 hours. When using fluorescent light as the light source (18.3 mW/cm$^2$), see FIG. 2d, it still can degrade MO (10 mg/L) by approximately 85% within 6 hours.

Characterization of PVDF/N—TiO$_2$ Membrane

Figure 3:
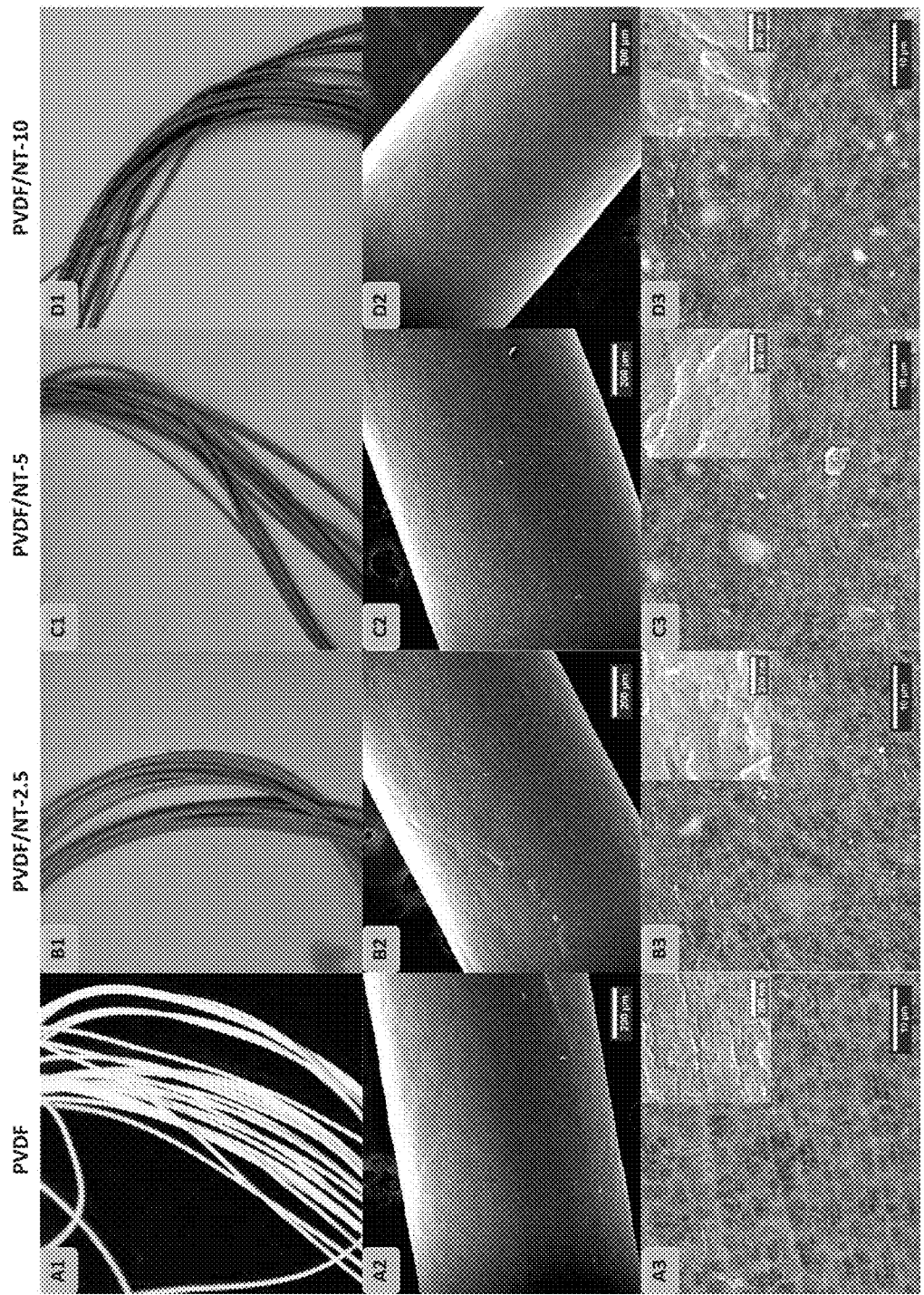
FIG. 3 is a series of digital photographs and SEM images of PVDF/N—$TiO_2$ membranes. Photographs labeled A1-D1 of FIG. 3 are digital photographs; photographs labeled A2-D2 are SEM images with a magnification of 200×; and photographs labeled A3-D3 are SEM images with a magnification of 5000×. In photographs A3-D3, higher magnification images are inserted in their upper right corner to better illustrate surface pore size.

Referring to FIG. 3, photographs A1-D1, the original PVDF membrane has a white color, whereas the incorporation of N—TiO$_2$ NPs resulted in a uniform brown tint of the membranes. The intensity of this brown color increased with increasing loading concentration. The uniformity of membrane color indicates the existence of N—TiO$_2$ NPs inside the membrane matrix and also suggests good dispersion of these materials. The SEM images designated A2-D2 show that all membranes have an outside diameter of approximately 900 μm, with some particles observable on the surface of mixed matrix membranes as shown in the images designated A3-D3. Higher magnification images are inserted in the upper right corner of the images A3-D3 to show changes in surface pore size.

Figure 4:
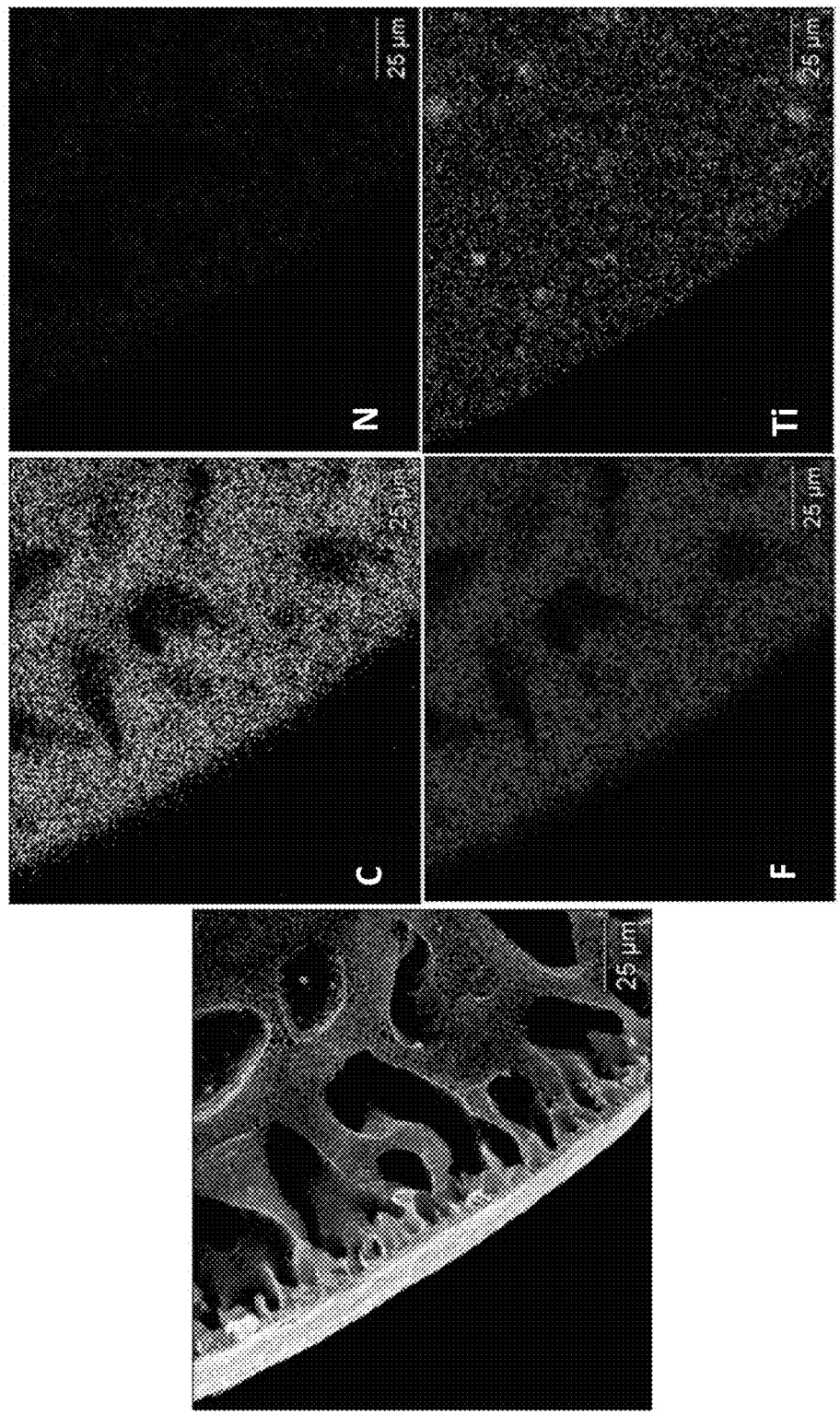
FIG. 4 is a SEM image (the leftmost image) with corresponding EDX mapping scanning spectra of PVDF/NT-5. The membranes containing various amount of N—$TiO_2$ were labeled as PVDF/NT-x, where x stands for the concentration of NPs. For example, if a membrane sample possessed 2.5 wt % N—$TiO_2$, this membrane was named PVDF/NT-2.5.

EDX mapping scanning spectra of PVDF/NT-5 membranes corresponding to carbon (C), nitrogen (N), fluorine (F), and titanium (Ti) elements, respectively, are shown in FIG. 4. Except for the C and F elements from PVDF, Ti and N elements were also detected and are shown to have a uniform distribution along the membrane's cross-section, indicating the successful incorporation of N—TiO$_2$ NPs inside the polymer matrix. The distribution of TiO$_2$ on the membrane's surface was also analyzed. The results further demonstrate generally uniform distribution of N—TiO$_2$ NPs on the PVDF/NT-5 membrane's surface. The actual amount of NPs incorporated inside the polymer matrix was further evaluated by burning the membrane under 800° C. for 2 hours inside a muffle furnace (with exposure to the atmosphere) and weighing the residue. Results indicate that the NPs concentrations were 0.15±0.32%, 1.67±0.09%, 3.78±0.16% and 6.77±0.24% for PVDF, PVDF/NT-2.5, PVDF/NT-5 and PVDF/NT-10, respectively, indicating that most of the input NPs remain inside the membrane matrix after the phase inversion and washing processes.

Figures 5A, 5B:
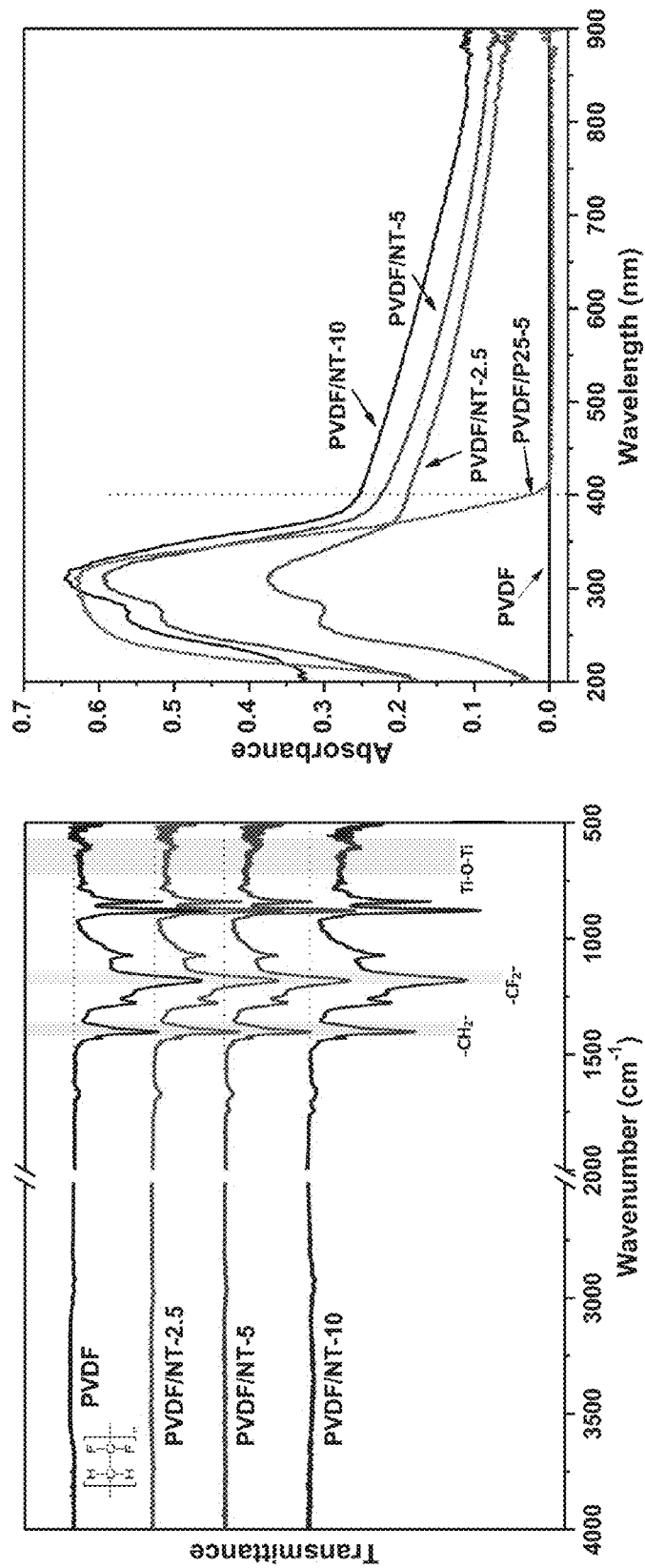

The ATR FT-IR spectra of PVDF and PVDF/N—TiO$_2$ HFMs are shown in FIG. 5a. The graph illustrates a strong absorption band at between 1180 cm$^{-1}$ and 1402 cm$^{-1}$ which is regarded as characteristic of CF$_2$ and CH$_2$ stretching modes, respectively, in PVDF [40]. In addition, the increased absorption band between 590 cm$^{-1}$ and 770 cm$^{-1}$ is attributed to the stretching vibration of the Ti—O—Ti and Ti—O bands [41], which indicate the existence of TiO$_2$ inside the membrane structure.

UV-Vis absorbances of membrane samples are presented in FIG. 5b. Except for the strong absorbance in the UV range, the N—TiO$_2$ incorporated membrane also demonstrated a clear absorbance in the visible range which indicates potential photocatalytic activity of the mixed matrix membrane under visible light irradiation. Absorbance also increased with an increasing N—TiO$_2$ concentration, indicating more NPs are located on the top layer of the membrane with increase loading concentrations. As a comparison, membranes incorporated with 5% P25 NPs demonstrate a clear absorbance in the UV range; while, no obvious absorbance was observed in the visible range.

Figure 5D:
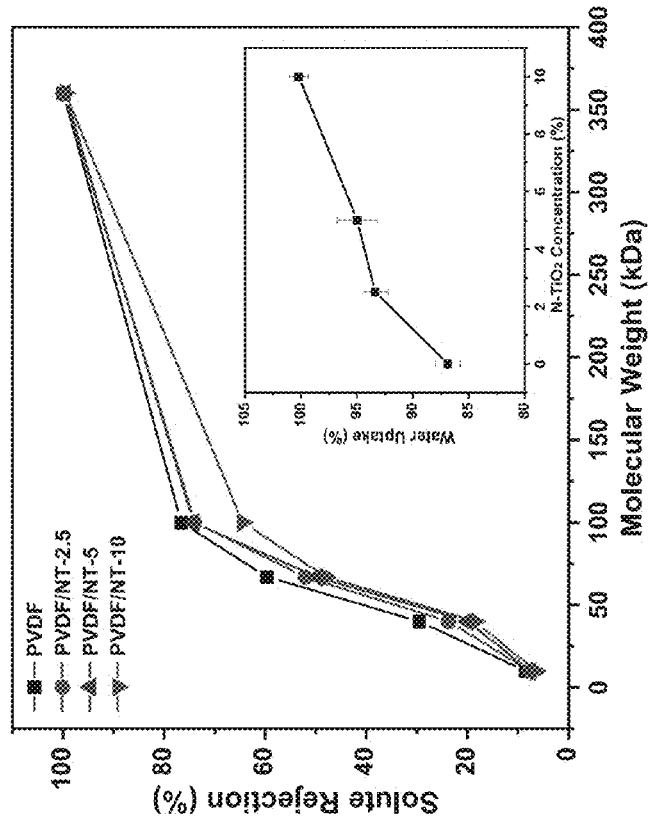
Figure 5C:
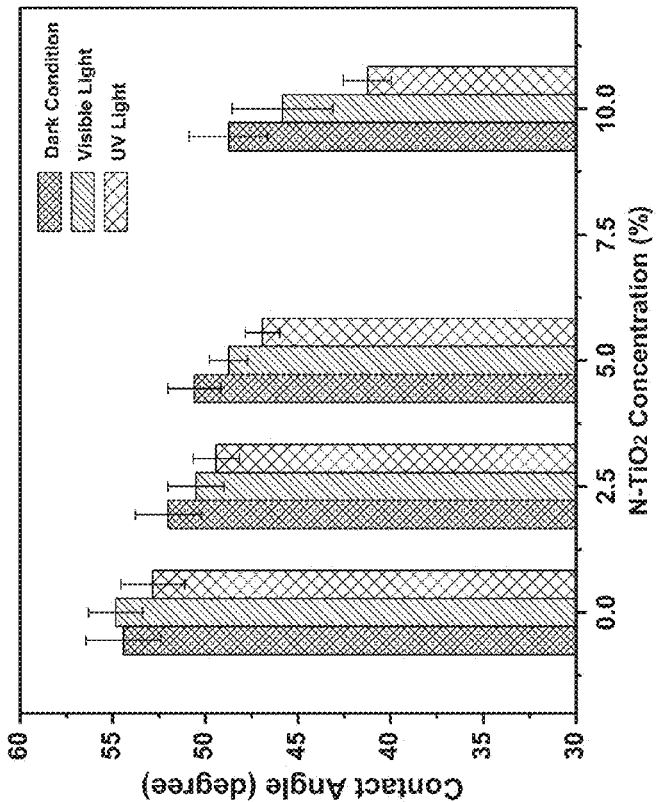

Referring to FIG. 5c, under a dark condition, the contact angle of the membranes decreased from 54.4±2.0° to 52.0±1.8°, 50.6±1.4°, and then to 48.9±2.1° with increasing NPs concentrations from 0 to 10%. This can be attributed to the hydrophilicity of $TiO_2$ located on a membrane's surface. Similarly, Yu et al. [37] and Rahimpour et al. [42] also observed a decrease of contact angle after blending $TiO_2$ NPs inside a polymeric membrane and attributed this change to the hydrophilicity of incorporated NPs. When membranes are irradiated with visible light, or even UV light, for 30 minutes, the contact angle for a mixed matrix membrane further decreases, although the change is not particularly significant.

FIG. 5d presents the results of water uptake and MWCO. Water uptake increases from 86.7±1.1% to 100.2±0.8% with increasing NPs loading from 0 to 10%. Meanwhile, MWCO increases after embedding NPs, where PVDF had a higher rejection for five tested molecules with different Mw (10, 40, 67, 100 and 360 kDa). With increasing NPs loading, solute rejections decrease, indicating the membrane becomes more porous and permeable. For example, the rejection for the molecule with a Mw of 100 kDa decreases from 76.6% for a PVDF membrane to 64.5% for PVDF/NT-10. This is consistent with the surface pore size previously discussed with respect to FIG. 3, images A3-D3. When the effects of $TiO_2$ NPs on the surface chemistry, structure and fouling performance of PES OF membranes were studied, Razmjou et al. [35] observed that after embedding 10-12.5% $TiO_2$ into a PES matrix, the MWCO of the membranes shifted from 100 kDa to approximately 240 kDa. It is postulated that the thermodynamic immiscibility induced by the addition of hydrophilic $TiO_2$ can lead to an enhanced phase separation; which, in turn, can further lead to a more porous and permeable membrane.

Figures 6A, 6B, 6C:
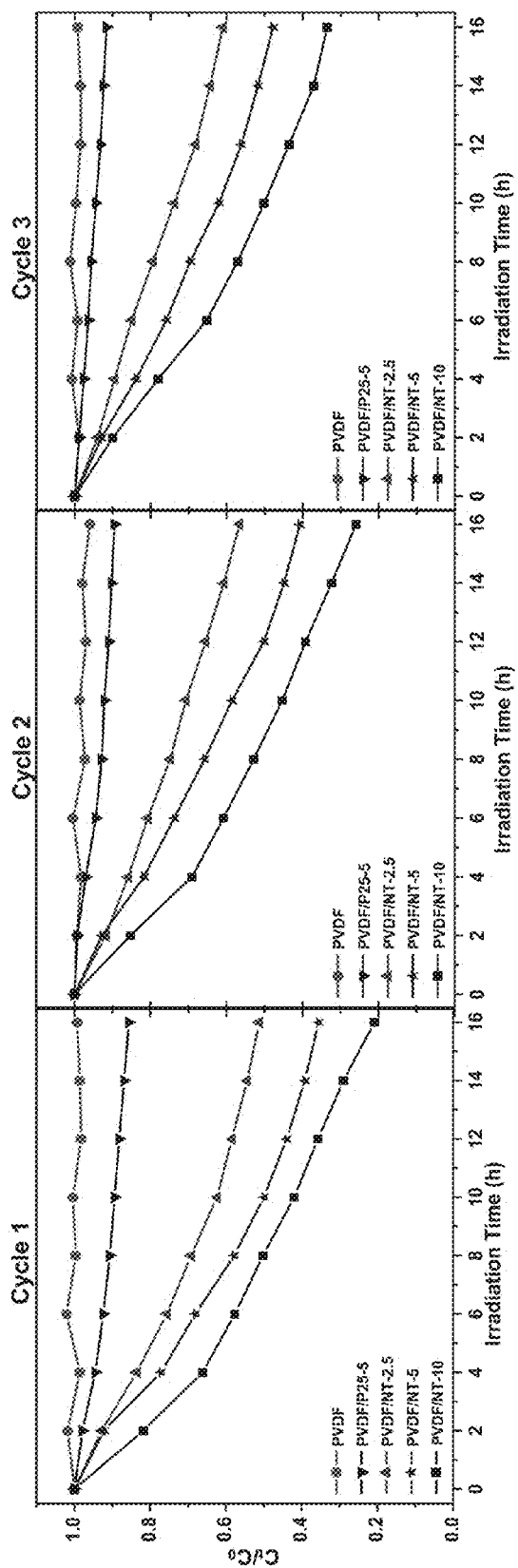

Photocatalytic properties of the mixed matrix membranes under visible light irradiation are also evaluated and the results presented in FIGS. 6a-6c. Here, N—$TiO_2$ incorporated membranes show clear activities under visible light irradiation. For PVDF/NT-10, a 79% removal rate of MO is achieved within 16 hours, whereas the PVDF/NT-2.5 and PVDF/NT-5 have a removal rate of 49% and 64%, respectively, for the same irradiation conditions. By way of comparison, baseline PVDF membrane has no obvious effect on MO concentration; while, membranes incorporated with 5% P25 have a much lower removal rate of around 10%. These results indicate that incorporation of N—$TiO_2$ produces membranes having photocatalytic properties with regard to organic materials under visible light irradiation.

Further cycles carried out as shown in FIGS. 6b and 6c, help to further evaluate the stability of photocatalytic properties. During these subsequent cycles, the photocatalytic activities of mixed matrix membranes gradually decreased. In cycle 3 (FIG. 6c), PVDF/NT-2.5, PVDF/NT-5 and PVDF/NT-10 have a removal rate of 39%, 52% and 66%, respectively. This decreased photocatalytic activity can be attributed to the loss of N—$TiO_2$ NPs from a membrane's surface during a photodegradation process involving mixing. However, the membranes still maintain relatively high photocatalytic activities even after three cycles of irradiation.

Figure 7B:
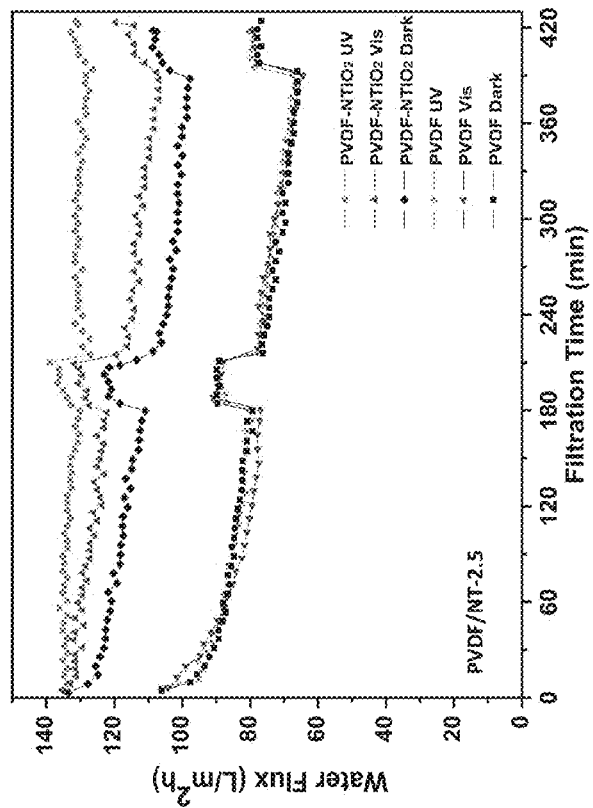
Figure 7A:
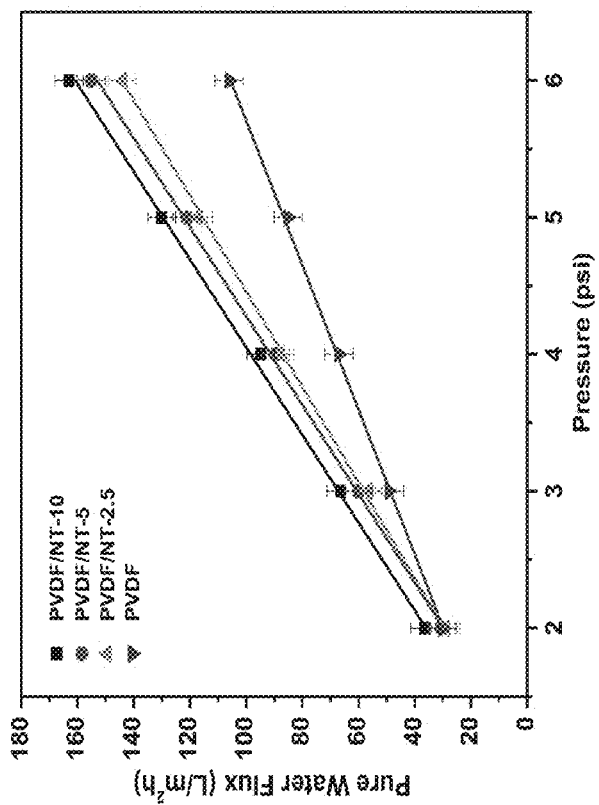
Figure 7C:
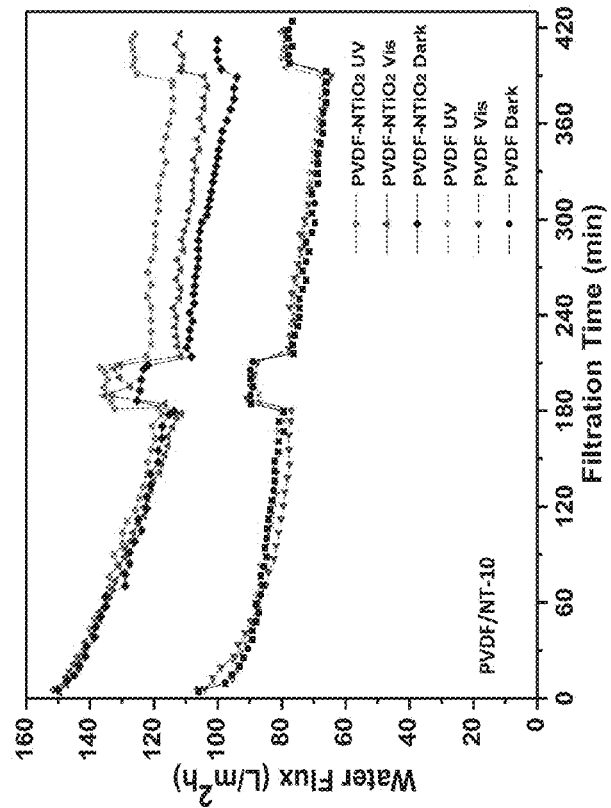
Figure 7D:
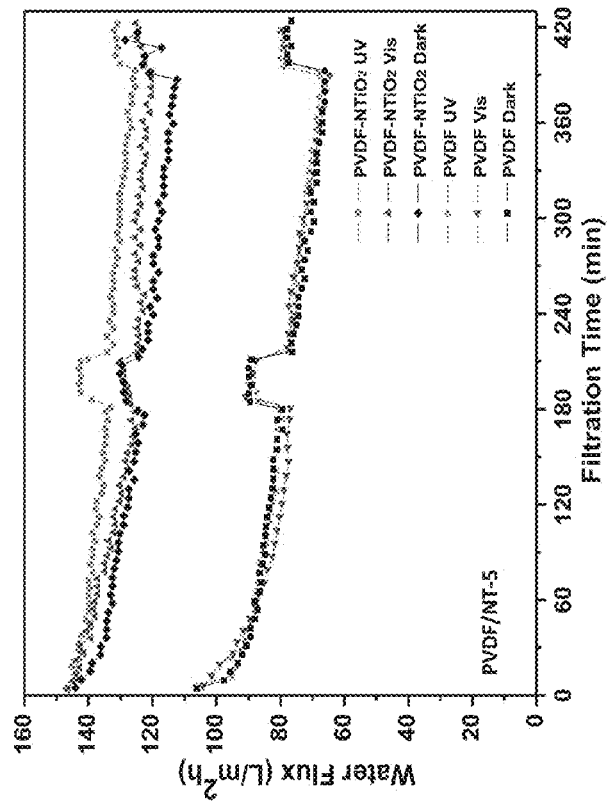

The pure water fluxes of all tested membranes, as a function of TMP, are shown in FIG. 7a. The baseline or original PVDF membrane has a water flux at 106±4 L/m²h under a pressure of 6 psi. All the other membranes have a higher pure water flux with the water flux gradually increasing with increasing loading concentration. For example, under the same TMP of 6 psi, water fluxes are 144±4, 155±5 and 163±6 L/m²h for PVDF/NT-2.5, PVDF/NT-5 and PVDF/NT-10, respectively. This is consistent with contact angle, water uptake and MWCO results, and is caused by increased surface hydrophilicity and porosity of a membrane after embedding N—$TiO_2$ NPs.

Further experiments have been carried out using HA as a model foulant to evaluate the fouling behaviors of membrane samples under various irradiation conditions (dark, visible light or UV irradiation). During these tests, all membrane samples, with or without N—$TiO_2$, demonstrated a rejection to HA above 96%. As presented in FIG. 7b, the original PVDF membrane demonstrated similar fouling behaviors with or without light irradiation, whereas the PVDF/NT-2.5 membrane had an improved fouling resistance under visible light irradiation for both cycles one or two. When UV light was applied, the fouling resistance of the membrane was further improved. Even under dark conditions, the N—$TiO_2$ incorporated membrane still exhibited a higher water flux and fouling resistance than the original PVDF membrane and this can be attributed to the enhanced surface hydrophilicity provided by $TiO_2$ NPs. The same trend was also observed for PVDF/NT-5. A similar phenomenon was observed by Zhang et al. [43], who used a $TiO_2$ nanowire membrane for HA removal. They found the TMP of the membrane increased slightly at an initial stage and then remained constant with UV irradiation; whereas, without UV irradiation, TMP continuously increased until sharply increasing after 7 hours of filtration. They attributed this phenomenon to the photocatalytic degradation of HA on the membrane surface which was activated by the UV irradiation.

The first cycle of PVDF/NT-10 showed no obvious difference under the different irradiation conditions. All fluxes decreased from around 150 L/m²h to around 120 L/m²h after 3 hours of filtration of a HA solution. This phenomenon seems to contradict with the expectation that higher surface hydrophilicity and higher photocatalytic activities of PVDF/NT-10 would lead to superior fouling resistance. However, this result can be explained in one of two ways. First, because of the larger porosity and MWCO, HA could penetrate inside the membrane's sublayer and result in internal fouling, with the surface hydrophilicity and photocatalytic property not working properly to mitigate flux decline. Second, the relatively higher water flux of PVDF/NT-10 made accumulation of HA inside the membrane occur more quickly which further lead to a more serious flux decline. Once the accumulation of foulant inside the membrane's structure narrowed the membrane's pores and made the filtration process become surface sieving, the superior surface hydrophilicity and photocatalytic capability of the membrane may work to mitigate surface fouling again. This may be why, during the second cycle, the membranes with UV and visible light irradiation began to show better antifouling behaviors than the membrane under the dark condition.

Mechanisms For The Enhanced Antifouling Properties Of Pvdf/N—$Tio_2$, Membranes

Figure 8:
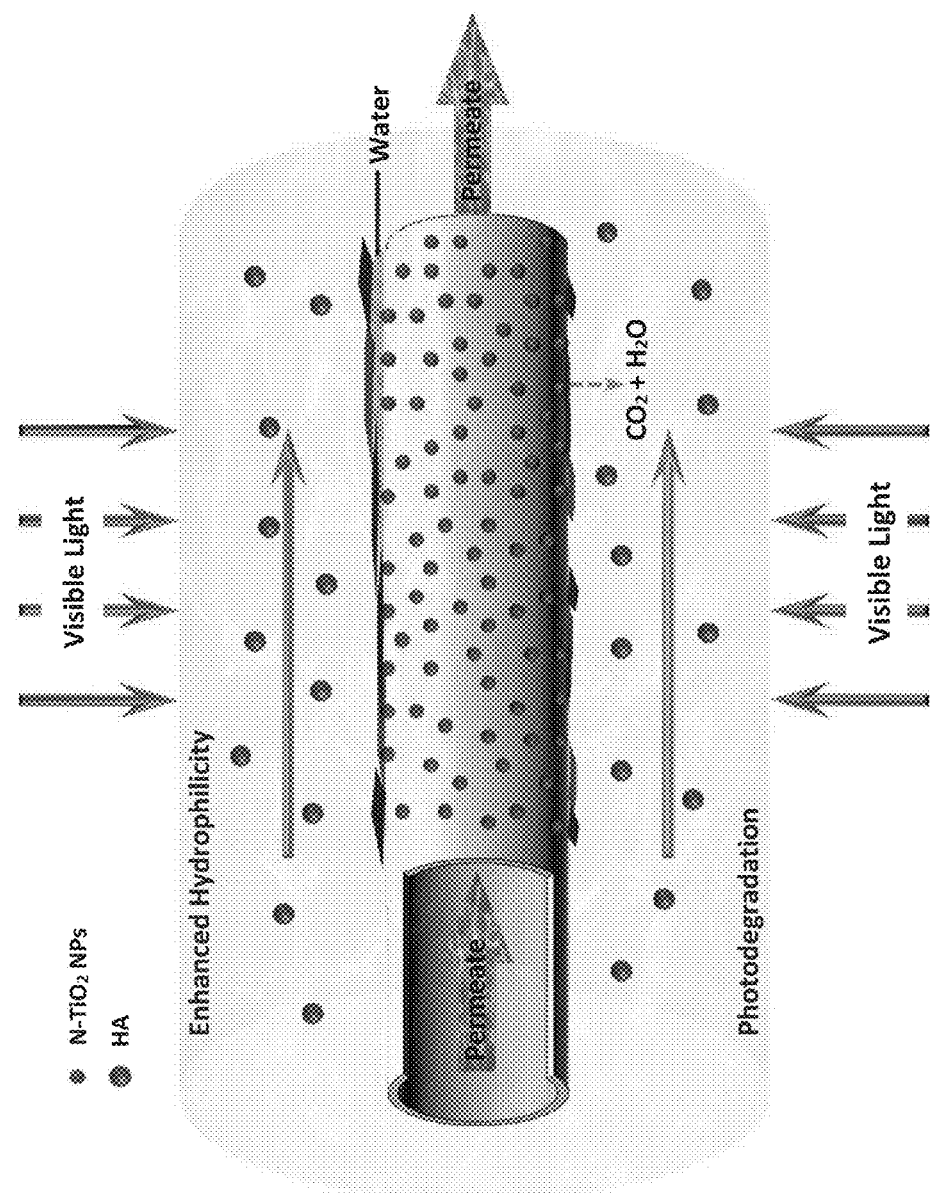
FIG. 8 is a schematic illustration of hypothesized mechanisms of PVDF/N—$TiO_2$ mixed matrix HFMs having enhanced anti-fouling properties.

A conceptual representation of the proposed mechanisms for the enhanced antifouling properties of a mixed-matrix membrane is shown in FIG. 8. As shown in the figure, the hollow fiber membrane is surrounded by a feed solution containing HA (as represented by the dark color balls) with an outside-to-in configuration. The smaller balls located on the membrane's surface represent the incorporated N—$TiO_2$ NPs. The enhanced antifouling properties of the membrane, under light irradiation, may result from two possible reasons. One is an improved surface hydrophilicity, which is provided both by the hydrophilic $TiO_2$ NPs and the photoinduced hydrophilicity enhancement of $TiO_2$. In addition, water molecules could occupy photo-generated oxygen vacancies and produce adsorbed OH groups, leading to an enhanced surface hydrophilicity of $TiO_2$ [44, 45]. With an enhanced surface hydrophilicity, the adsorption of HA on a membrane's surface could be reduced with already deposited HA being more easily removed by cross flow. This is consistent with the general strategy of mitigating UF membrane fouling by enhancing membrane surface hydrophilicity [46-48].

The other reason is the photodegradation process which could decompose HA around the membrane's surface by producing strong oxidant reagents such as hydroxyl radicals (.OH) [6, 38, 42]. This phenomenon could mitigate the accumulation of HA on the membrane's surface, and then maintain a relatively high flux compared to that of the original PVDF membrane measured during the fouling test.

Possible Next Steps

The test results discussed above demonstrate that the antifouling properties of a PVDF/N—$TiO_2$ mixed-matrix HFMs are improved under light irradiation, especially under UV light. However, the enhancement and durability of those antifouling properties remains a challenge for the ultimate goal of practical application of the membranes. Currently, improvement of the antifouling properties is limited by the physicochemical properties of embedded $TiO_2$, and the availability of suitable light. The amount of surface located $TiO_2$ determines the number of activated sites; photocatalytic activities determine the efficiency at a single location; and the interaction between $TiO_2$ and the polymer matrix determines the stability of those surface located activated sites. The antifouling properties of the novel membrane described above could be further improved using several improvement strategies.

More NPs could be blended into the membrane casting solution so to increase the amount of surface located $TiO_2$. However, the percentage of $TiO_2$ in the casting solution would probably have an upper bound or limit based on the criterion that no dramatic change or damage to the membrane's structure (surface pore size, porosity et al.) occurs.

Other research indicating further improvement of photocatalytic efficiency of $TiO_2$ through doping, coupling, sensitization or hydrogenation is continuing, including a N—F-codoped $TiO_2$ [49], CdS/$TiO_2$ coupled semiconductor [50], and black hydrogenated $TiO_2$ [51], this indicating an opportunity for the development of visible light activated mixed-matrix membranes.

The interaction between $TiO_2$ and a polymer matrix could be improved by modifying the $TiO_2$ surface with certain agents such as polyacrylic acid (PAA) [41] or silane coupling agents [52, 53]. However such modification need to be controlled to prevent serious blocking of the contacts between either light and $TiO_2$, or between contaminates and strong oxidant reagents generated during the photodegradation process. At the same time, the modification agent needs to be stable enough to tolerate the effect of oxidant reagents.

Although the enhanced water flux of mixed-matrix membranes can offset some of the pack-density decrease, there is still a problem as to how to design a membrane module that makes the most of a membrane's exposure to light irradiation without sacrificing too much specific membrane area. A solution to this problem would be the use of optical materials that are introduced into the membrane module design and fabrication so to bring in light from an outside source and expand the available light inside the module. Besides sun light, energy efficient light sources, such as light-emitting diodes (LEDs), which have low power consumption, quick response time, flexibility, a long usable life, and small footprint [49, 54], could be used inside the module for light irradiation.

Conclusions

In accordance with the invention, what has been found is that N—$TiO_2$ NPs with visible light activity can be used in the fabrication of PVDF/N—$TiO_2$ mixed matrix HFMs through a phase inversion method using a blending approach. Resulting membranes have a brown color and improved hydrophilicity, especially under light irradiation. When compared to earlier PVDF and PVDF/P25-5 membranes, mixed matrix membranes containing N—$TiO_2$ NPs clearly demonstrate photocatalytic activities under visible light irradiation. This is consistent with the UV-Vis absorbance results, where all N—$TiO_2$ incorporated membranes had improved absorbance in the visible light range in addition to the characteristic absorption peak of $TiO_2$ in the UV range. Membrane performance assessments indicate that PVDF/N—$TiO_2$ membranes possess enhanced water flux, similar HA rejection (e.g., above 96%), and improved fouling resistance compared to a control PVDF membrane. Further, results demonstrate the potential of the methodology for development of membranes having improved water permeability and superior antifouling properties, this being based upon a photodegradation process and a photoinduced hydrophilicity enhancement driven by solar light as a renewable source of energy. Practical applications are related to photodegradation and separation, especially where light is available or essential. The applications include, but are not limited to, an algae bioreactor, surface water treatment, wastewater treatment effluent polishing, and photodegradation of organic contaminants under sun light irradiation.

In view of the above, it will be seen that the several objects and advantages of the present disclosure have been achieved and other advantageous results have been obtained.

Appendix A

REFERENCES

1. Fujishima, A.; Honda, K., Electrochemical photolysis of water at a semiconductor electrode. Nature 1972, 238, (5358), 37-38.
2. Mills, A.; Le Hunte, S., An overview of semiconductor photocatalysis. Journal of Photochemistry and Photobiology A: Chemistry 1997, 108, (1), 1-35.
3. Paz, Y., Application of $TiO_2$ photocatalysis for air treatment: Patents' overview. Applied Catalysis 8: Environmental 2010, 99, (3-4), 448-460.
4. Yu, J.; Yu, J. C.; Ho, W.; Jiang, Z., Effects of calcination temperature on the photocatalytic activity and photo-induced super-hydrophilicity of mesoporous $TiO_2$ thin films. New Journal of Chemistry 2002, 26, (5), 607-613.
5. Chong, M. N.; Jin, B.; Chow, C. W. K.; Saint, C., Recent developments in photocatalytic water treatment technology: A review. Water Research 2010, 44, (10), 2997-3027.
6. Chen, X.; Mao, S. S., Titanium dioxide nanomaterials: Synthesis, properties, modifications and applications. Chemical Reviews 2007, /07, (7), 2891-2959.
7. Joung, S. K.; Amemiya, T.; Murabayashi, M.; Itoh, K., Mechanistic studies of the photocatalytic oxidation of trichloroethylene with visible-light-driven N-doped $TiO_2$ photocatalysts. Chemistry—A European Journal 2006, 12, (21), 5526-5534.
8. Nazeeruddin, M. K.; Pechy, P.; Gratzel, M., Efficient panchromatic sensitization of nanocrystalline $TiO_2$ films by a black dye based on a trithiocyanatoruthenium complex. Chemical Communications 1997, (18), 1705-1706.
9. Hara, K.; Tachibana, Y.; Ohga, Y.; Shinpo, A.; Suga, S.; Sayama, K.; Sugihara, H.; Arakawa, H., Dye-sensitized nanocrystalline $TiO_2$ solar cells based on novel coumarin dyes. Solar Energy Materials and Solar Cells 2003, 77, (1), 89-103.
10. Mrowetz, M.; Villa, A.; Prati, L.; Selli, E., Effect of Au nanoparticles on $TiO_2$ in the photocatalytic degradation of an azo dye. Gold Bulletin 2007, 40, (2), 154-160.
11. Sangpour, P.; Hashemi, F.; Moshfegh, A. Z., Photoenhanced degradation of methylene blue on cosputtered $M:TiO_2$ (M=Au, Ag, Cu) nanocomposite systems: A comparative study. Journal of Physical Chemistry C 2010, 114, (33), 13955-13961.
12. Serpone, N., Is the band gap of pristine $TiO_2$ narrowed by anion- and cation-doping of titanium dioxide in second-generation photocatalysts? Journal of Physical Chemistry B 2006, 110, (48), 2428724293.
13. Xu, A. W.; Gao, Y.; Liu, H. Q., The preparation, characterization, and their photocatalytic activities of rare-earth-doped $TiO_2$ nanoparticles. Journal of Catalysis 2002, 207, (2), 151-157.
14. Asahi, R.; Morikawa, T.; Ohwaki, T.; Aoki, K.; Taga, Y., Visible-light photocatalysis in nitrogen-doped titanium oxides. Science 2001, 293, (5528), 269-271.
15. Di Valentin, C.; Finazzi, E.; Pacchioni, G.; Selloni, A.; Livraghi, S.; Paganini, M. C.; Giamello, E., N-doped $TiO_2$: Theory and experiment. Chemical Physics 2007, 339, (1-3), 44-56.
16. Morikawa, T.; Asahi, R.; Ohwaki, T.; Aoki, K.; Taga, Y., Band-gap narrowing of titanium dioxide by nitrogen doping. Japanese Journal of Applied Physics, Part 2: Letters 2001, 40, (6 A), L561-L563.
17. Ho, W.; Yu, J. C.; Lee, S., Synthesis of hierarchical nanoporous F-doped $TiO_2$ spheres with visible light photocatalytic activity. Chemical Communications 2006, (10), 1115-1117.
18. Ohno, T.; Akiyoshi, M.; Umebayashi, T.; Asai, K.; Mitsui, T.; Matsumura, M., Preparation of S-doped $TiO_2$ photocatalysts and their photocatalytic activities under visible light. Applied Catalysis A: General 2004, 265, (1), 115-121.
19. Ohno, T.; Mitsui, T.; Matsumura, M., Photocatalytic activity of S-doped $TiO_2$ photocatalyst under visible light. Chemistry Letters 2003, 32, (4), 364-365.
20. Yu, J.; Xiang, Q.; Zhou, M., Preparation, characterization and visible-light-driven photocatalytic activity of Fe-doped titania nanorods and first-principles study for electronic structures. Applied Catalysis B: Environmental 2009, 90, (3-4), 595-602.
21. Herrmann, J. M.; Disdier, J.; Pichat, P., Effect of chromium doping on the electrical and catalytic properties of powder titania under UV and visible illumination. Chemical Physics Letters 1984, 108, (6), 618-622.
22. Colon, G.; Maicu, M.; Hidalgo, M. C.; Navio, J. A., Cu-doped $TiO_2$ systems with improved photocatalytic activity. Applied Catalysis B: Environmental 2006, 67, (1-2), 41-51.
23. Devi, L. G.; Kumar, S. G.; Murthy, B. N.; Kottam, N., Influence of $Mn^{2+}$ and $Mo^{6+}$ dopants on the phase transformations of $TiO_2$ lattice and its photo catalytic activity under solar illumination. Catalysis Communications 2009, 10, (6), 794-798.
24. Murphy, A. B., Does carbon doping of $TiO_2$ allow water splitting in visible light? Comments on "Nanotube enhanced photoresponse of carbon modified (CM)-n-$TiO_2$ for efficient water splitting". Solar Energy Materials and Solar Cells 2008, 92, (3), 363-367.
25. Xi, W.; Geissen, S. U., Separation of titanium dioxide from photocatalytically treated water by cross-flow microfiltration. Water Research 2001, 35, (5), 1256-1262.
26. Le-Clech, P.; Lee, E. K.; Chen, V., Hybrid photocatalysis/membrane treatment for surface waters containing low concentrations of natural organic matters. Water Research 2006, 40, (2), 323-330.
27. Kim, J.; Van Der Bruggen, B., The use of nanoparticles in polymeric and ceramic membrane structures: Review of manufacturing procedures and performance improvement for water treatment. Environmental Pollution 2010, /58, (7), 2335-2349.
28. Sotto, A.; Boromand, A.; Zhang, R.; Luis, P.; Arsuaga, J. M.; Kim, J.; Van der Bruggen, B., Effect of nanoparticle aggregation at low concentrations of $TiO_2$ on the hydrophilicity, morphology, and fouling resistance of PES-$TiO_2$ membranes. Journal of Colloid and Interface Science 2011, 363, (2), 540-550.
29. Xiao, Y. T.; Xu, S. S.; Li, Z. H.; An, X. H.; Zhou, L.; Zhang, Y. L.; Shiang, F. Q., Progress of applied research on $TiO_2$ photocatalysis-membrane separation coupling technology in water and wastewater treatments. Chinese Science Bulletin 2010, 55, (14), 1345-1353.
30. Kwak, S. Y.; Kim, S. H.; Kim, S. S., Hybrid organic/inorganic reverse osmosis (RO) membrane for bactericidal anti-fouling. 1. Preparation and characterization of $TiO_2$ nanoparticle self-assembled aromatic polyamide thin-film-composite (TFC) membrane. Environmental Science and Technology 2001, 35, (11), 2388-2394.
31. Kim, S. H.; Kwak, S.-Y.; Sohn, B.-H.; Park, T. H., Design of $TiO_2$ nanoparticle self-assembled aromatic polyamide thin-film-composite (TFC) membrane as an approach to solve biofouling problem. Journal of Membrane Science 2003, 211, (1), 157-165.
32. Bae, T.-H.; Tak, T.-M., Preparation of $TiO_2$ self-assembled polymeric nanocomposite membranes and examination of their fouling mitigation effects in a membrane bioreactor system. Journal of Membrane Science 2005, 266, (1-2), 1-5.
33. Bae, T.-H.; Tak, T.-M., Effect of $TiO_2$ nanoparticles on fouling mitigation of ultrafiltration membranes for activated sludge filtration. Journal of Membrane Science 2005, 249, (1-2), 1-8.
34. Wu, G.; Gan, S.; Cui, L.; Xu, Y., Preparation and characterization of PES/$TiO_2$ composite membranes. Applied Surface Science 2008, 254, (21), 7080-7086.
35. Razmjou, A.; Mansouri, J.; Chen, V., The effects of mechanical and chemical modification of $TiO_2$ nanoparticles on the surface chemistry, structure and fouling performance of PES ultrafiltration membranes. Journal of Membrane Science 2011, 378, (1-2), 73-84.
36. Hu, W.; Yin, J.; Deng, B.; Hu, Z., Application of nano $TiO_2$ modified hollow fiber membranes in algal membrane bioreactors for high-density algae cultivation and wastewater polishing. Bioresource Technology 2015, 193, 135-141.
37. Yu, L. Y.; Shen, H. M.; Xu, Z. L., PVDF-$TiO_2$ composite hollow fiber ultrafiltration membranes prepared by $TiO_2$ sol-gel method and blending method. Journal of Applied Polymer Science 2009,113, (3), 1763-1772.
38. Wang, Z.; Cai, W.; Hong, X.; Zhao, X.; Xu, F.; Cai, C., Photocatalytic degradation of phenol in aqueous nitrogen-doped $TiO_2$ suspensions with various light sources. Applied Catalysis B: Environmental 2005, 57, (3), 223-231.

39. Yin, J.; Zhu, G.; Deng, B., Multi-walled carbon nanotubes (MWNTs)/polysulfone (PSU) mixed matrix hollow fiber membranes for enhanced water treatment. Journal of Membrane Science 2013, 437, 237-248.
40. Deng, B.; Yu, M.; Yang, X.; Zhang, B.; Li, L.; Xie, L.; Li, J.; Lu, X., Antifouling microfiltration membranes prepared from acrylic acid or methacrylic acid grafted poly(vinylidene fluoride) powder synthesized via pre-irradiation induced graft polymerization. Journal of Membrane Science 2010, 350, (12), 252-258.
41. Madaeni, S. S.; Zinadini, S.; Vatanpour, V., A new approach to improve antifouling property of PVDF membrane using in situ polymerization of PAA functionalized $TiO_2$ nanoparticles. Journal of Membrane Science 2011, 380, (1-2), 155-162.
42. Rahimpour, A.; Madaeni, S. S.; Taheri, A. H.; Mansourpanah, Y., Coupling $TiO_2$ nanoparticles with UV irradiation for modification of polyethersulfone ultrafiltration membranes. Journal of Membrane Science 2008, 3/3, (1-2), 158-169.
43. Zhang, X.; Du, A. J.; Lee, P.; Sun, D. D.; Leckie, J. O., $TiO_2$ nanowire membrane for concurrent filtration and photocatalytic oxidation of humic acid in water. Journal of Membrane Science 2008, 313, (1-2), 44-51.
44. Fujishima, A.; Rao, T. N.; Tryk, D. A., Titanium dioxide photocatalysis. Journal of Photochemistry and Photobiology C: Photochemistry Reviews 2000, 1, (1), 1-21.
45. Wang, R.; Hashimoto, K.; Fujishima, A.; Chikuni, M.; Kojima, E.; Kitamura, A.; Shimohigoshi, M.; Watanabe, T., Light-induced amphiphilic surfaces. Nature 1997, 388, (6641), 431-432.
46. Liu, F.; Xu, Y.-Y.; Zhu, B.-K.; Zhang, F.; Zhu, L.-P., Preparation of hydrophilic and fouling resistant poly (vinylidene fluoride) hollow fiber membranes. Journal of Membrane Science 2009, 345, (1-2), 331339.
47. Jonsson, C.; Jonsson, A.-S., Influence of the membrane material on the adsorptive fouling of ultrafiltration membranes. Journal of Membrane Science 1995, 108, (1-2), 79-87.
48. Cornelissen, E. R.; van den Boomgaard, T.; Strathmann, H., Physicochemical aspects of polymer selection for ultrafiltration and microfiltration membranes. Colloids and Surfaces A: Physicochemical and Engineering Aspects 1998, 138, (2-3), 283-289.
49. Li, D.; Haneda, H.; Hishita, S.; Ohashi, N., Visible-light-driven N—F-codoped $TiO_2$ photocatalysts. 2. Optical characterization, photocatalysis, and potential application to air purification. Chemistry of Materials 2005, 17, (10), 2596-2602.
50. Chows, N.; Entezari, M. H., Fast and easy synthesis of core-shell nanocrystal ($CdS/TiO_2$) at low temperature by micro-emulsion under ultrasound. Ultrasonics Sonochemistry 2011,18, (2), 629-634.
51. Chen, X.; Liu, L.; Yu, P. Y.; Mao, S. S., Increasing solar absorption for photocatalysis with black hydrogenated titanium dioxide nanocrystals. Science 2011, 331, (6018), 746-750.
52. Razmjou, A.; Resosudarmo, A.; Holmes, R. L.; Li, H.; Mansouri, J.; Chen, V., The effect of modified $TiO_2$ nanoparticles on the polyethersulfone ultrafiltration hollow fiber membranes. Desalination 2012, 287, 271-280.
53. Rajaeian, B.; Rahimpour, A.; Tade, M. O.; Liu, S., Fabrication and characterization of polyamide thin film nanocomposite (TFN) nanofiltration membrane impregnated with $TiO_2$ nanoparticles. Desalination 2013, 313, (0), 176-188.
54. Wang, X.; Lim, T.-T., Solvothermal synthesis of C-N codoped $TiO_2$ and photocatalytic evaluation for bisphenol A degradation using a visible-light irradiated LED photoreactor. Applied Catalysis 8: Environmental 2010,100, (1-2), 355-364.

Having thus described the invention, what is claimed and desired to be secured by Letters Patent is:

1. Antifouling membranes for use in water treatment and materials separation, the membranes having integrating fillers with visible light photocatalytic activity comprising nitrogen—doped $TiO_2$ nanoparticles used to produce Poly (vinyledene fluoride) PVDF/N—$TiO_2$ mixed matrix hollow fiber membranes (HFMs) which are activated by visible light, the membranes exhibiting an enhanced surface hydrophilicity compared to a PVDF membrane, and with the fillers also affecting a surface cleaning through a photodegradation process resulting from visible light irradiation so to enhance the fouling resistance of the membranes to organic materials and biomaterials compared to a PVDF membrane.

2. The antifouling membranes of claim 1 in which the nitrogen-doped $TiO_2$ nanoparticles are blended in a phase inversion process to produce the Poly(vinyledene fluoride) PVDF/N—$TiO_2$ mixed matrix HFMs.

3. The antifouling membranes of claim 2 in which PVDF/N—$TiO_2$ mixed matrix HFMs are produced by the phase inversion process using a head spinning process.

4. The antifouling membranes of claim 3 in which the head spinning process involves a dope solution including a predetermined amount of N—$TiO_2$ dispersed in an NMP solvent and with the resulting mixture sonicated for a predetermined period of time to achieve dispersion.

5. The antifouling membranes of claim 4 in which PVP is added into the mixture which is then stirred for a predetermined period of time after which PVDF is added and the resulting mixture stirred for a another predetermined period of time at a predetermined temperature to form the dope solution.

6. The antifouling membranes of claim 5 further including degassing the dope solution prior to its usage in producing fibers forming the matrix of the membranes.

7. The antifouling membranes of claim 6 in which fibers collected from the spinning process are rinsed in deionized water for a predetermined period of time at room temperature to remove residual solvent, then immersed in a 25 wt % glycerol aqueous solution for another predetermined period, and then dried in an ambient environment.

8. The antifouling membranes of claim 1 in which the nitrogen-doped $TiO_2$ nanoparticles are synthesized.

9. The antifouling membranes of claim 8 in which the nitrogen-doped $TiO_2$ nanoparticles are synthesized using tetrabutyl titanate as a titania precursor and an ammonia aqueous solution as a nitrogen source.

10. The antifouling membranes of claim 9 in which a predetermined amount of the ammonia aqueous solution is added into a tetrabutyl titanate solution at room temperature and stirred for a predetermined amount of time to carry out hydrolysis and produce a $TiO_2$ precursor.

11. The antifouling membranes of claim 10 in which the precursor is dried at a predetermined temperature for a predetermined period of time and then calcinated at another predetermined temperature for another predetermined period of time to obtain N—$TiO_2$ nanoparticles.

12. The antifouling membranes of claim 1 in which synthesized N—$TiO_2$ nanoparticles have an average particle size of approximately 50 nm and a BET surface area of approximately 197 $m^2/g$.

13. The antifouling membranes of claim 1 in which membranes have a uniform brown tint the intensity of which increases with increasing loading concentration, the uniformity of membrane color indicating the existence of dispersed N—$TiO_2$ nanoparticles inside the membrane matrix.

14. The antifouling membranes of claim 13 further having a uniform distribution of said fillers in a cross-section of a membrane and over the membrane's surface.

15. The antifouling membranes of claim 1 which demonstrates absorbance in the visible light range indicating potential photocatalytic activity of the mixed matrix membranes under visible light irradiation.

16. The antifouling membranes of claim 15 in which absorbance increases with an increasing N—$TiO_2$ concentration indicating more nanoparticles are located on a top layer of a membrane with increased loading concentrations.

17. The antifouling membranes of claim 1 in which, under a dark condition, a contact angle of the membranes decreases with an increased concentration of nanoparticles from 0 to 10% in the membranes.

18. The antifouling membranes of claim 17 in which water uptake increases with an increased concentration of said nanoparticles from 0 to 10%.

19. The antifouling membranes of claim 1 in which molecular weight cut-off increases with the embedding of nanoparticles in the membranes resulting in the membranes becoming more porous and permeable than a PVDF membrane without the nitrogen doped titanium dioxide nanoparticles.

20. The antifouling membranes of claim 1 which demonstrates photocatalytic properties with regard to organic materials under visible light irradiation.

21. The antifouling membranes of claim 1 which, under visible light irradiation, demonstrates better fouling resistance toward a HA solution than a PVDF membrane without the nitrogen-doped $TiO_2$ nanoparticles.

* * * * *